Sept. 9, 1952          A. C. DAVIS          2,609,911

ARTICLE GROUPING MECHANISM

Filed March 12, 1948          4 Sheets-Sheet 1

Inventor
Allan C. Davis

Thomas W. Clark
Attorney

Witness
P. H. Flautt

Sept. 9, 1952 A. C. DAVIS 2,609,911
ARTICLE GROUPING MECHANISM
Filed March 12, 1948 4 Sheets-Sheet 2

Inventor
Allan C. Davis
By Thomas W. Y. Clark
Attorney

Witness
P. H. Pleutt

Sept. 9, 1952            A. C. DAVIS            2,609,911

ARTICLE GROUPING MECHANISM

Filed March 12, 1948            4 Sheets-Sheet 3

Inventor
Allan C. Davis
By Thomas W. J. Clark
Attorney

Witness
P. W. Plauth

Sept. 9, 1952 A. C. DAVIS 2,609,911
ARTICLE GROUPING MECHANISM
Filed March 12, 1948 4 Sheets-Sheet 4

Witness
P. H. Flautt

Inventor
Allan C. Davis
By Thomas W. Y. Clark
Attorney

Patented Sept. 9, 1952

2,609,911

UNITED STATES PATENT OFFICE 2,609,911

ARTICLE GROUPING MECHANISM

Allan C. Davis, Baltimore, Md.

Application March 12, 1948, Serial No. 14,457

9 Claims. (Cl. 198—31)

This invention relates to an improvement in the article grouping mechanism of the case filling machine shown in applicant's Patent No. 2,318,598, issued May 11, 1943.

As shown in that patent, the article grouping mechanism has the purpose of dividing a group of articles brought on a horizontal conveyor to another conveyor into groups of any designated number for which the machine has been designed. An object of the present improvement is to make the machine adjustable, or adaptable so that regardless of the number of articles which may have previously passed the article sensitive mechanism, that mechanism may be set at any instant to deliver the articles from the first to the second conveyor in groups of the prescribed number. Another object of the present invention is to make the mechanism more sensitive in its operation, and more sensitive to the passage of articles past the article sensitive element. Another object of the invention is to construct the article sensitive or counting mechanism and switches of interchangeable parts to gain greater economy of manufacture and maintenance.

Although the invention is shown as related to a case filling machine, as shown in applicant's above numbered prior patent, it is not limited to use on that machine.

Other objects and advantages of the invention will appear from the following description and the accompanying drawings forming a part hereof and in which.

In the drawings similar numerals refer to similar parts throughout the several views.

Figure 1:
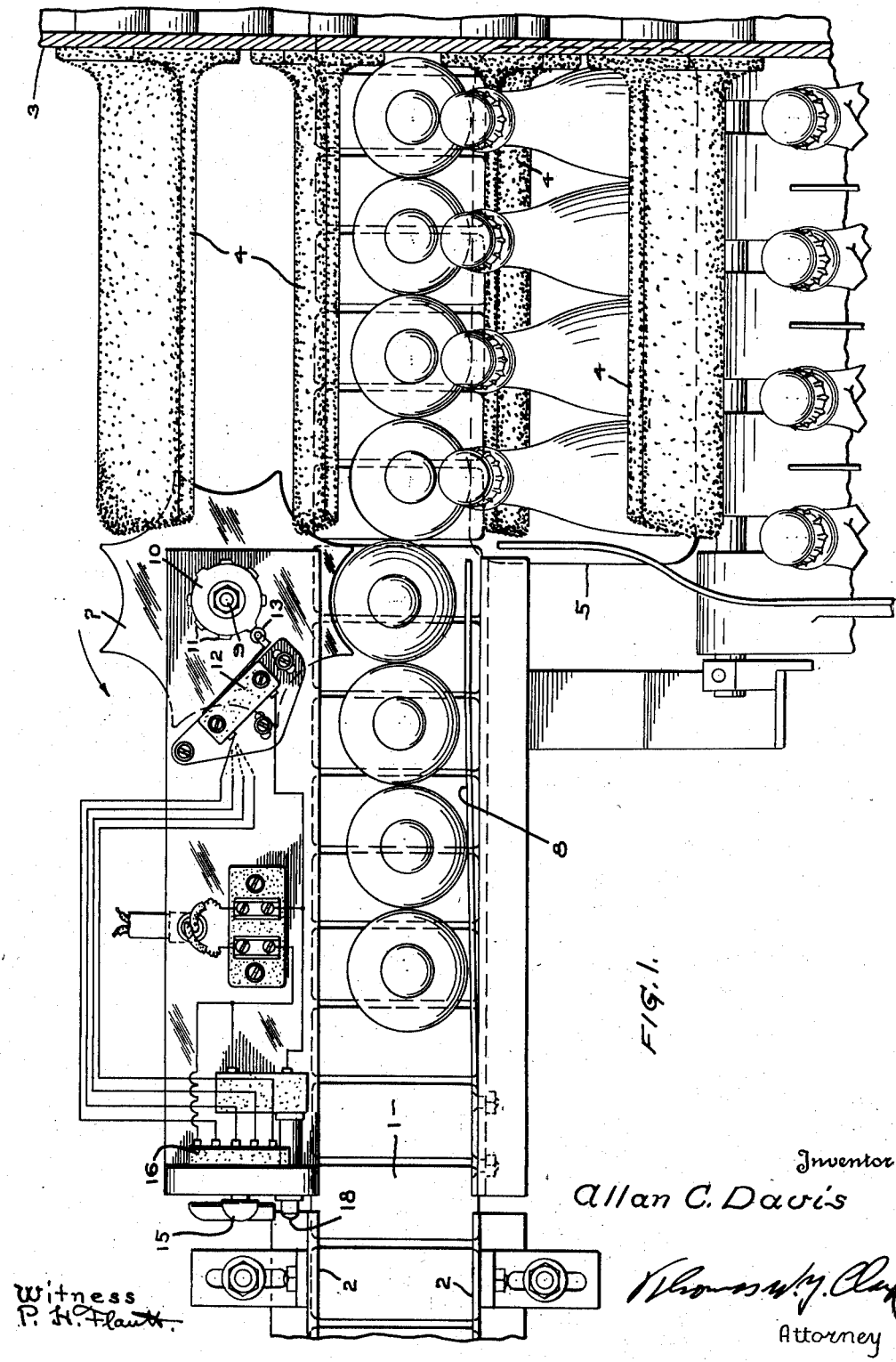
Figure 1 is a top plan view of the conveyors and counting mechanism involved in the invention.

As shown in applicant's above mentioned patent, bottles or other articles after a previous operation such as filling are carried along by a horizontal conveyor 1. During the operation of the machine this conveyor is constantly driven and should the articles accumulate thereon the conveyor will simply slide under the articles. Preferably the conveyor has guides 2 at each side to limit the lateral movement of the bottles. A conveyor or magazine 3 rotating in a vertical plane is placed over the end of the horizontal conveyor 1. The magazine comprises a plurality of radially disposed rubber covered blades or pushers 4 which extend radially from the circular base of the magazine. These blades serve as pushers, the bottles being delivered between adjacent blades on the conveyor 1 and from the end of this conveyor 1, the bottles are propelled or pushed by the blades 4 to and from a supporting plate 5 until they fall into cases 6 passing under the magazine.

As shown in the above patent, the magazine is driven intermittently, although the driving mechanism that might effect its movement is constantly operating. As shown in that patent the magazine has a depending arm which moves it the distance of the space between two of the blades 4, to present an empty space to the conveyor 1 with each swing of the arm and upon the return of the arm, the magazine is held stationary. A constantly operating reciprocating member is attached to the arm to swing it in this pendulum like manner only upon the actuation of a solenoid switch 6A, which throws a latch into position in this constantly operating member to hold the pendulum like arm and move it its one step at a time. Immediately upon the release of the solenoid switch the constantly operating reciprocating member on the machine is released from its moving hold on the pendulum arm so that that arm after being pulled back to its initial position remains stationary until the solenoid switch is again actuated. This structure is all old as shown in the above patent and forms no part of the present invention.

The counting means of the present invention consists of a star wheel 7 which has a plurality of openings or pockets therein, between its points, to allow the passage of the bottles or articles thereby. The articles are preferably held and guided into position to turn the star wheel by additional guide 8 extending vertically on the opposite side of the bottles from the star wheel. The star wheel is preferably placed on a square shaft 9. On this shaft are placed a pile of cams, each cam 10 having two diametrically opposed cam surfaces 11.

Figure 4:
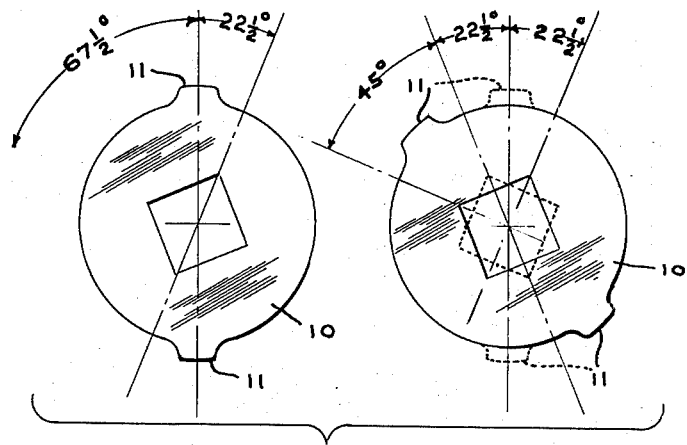
Figure 4 is a plan view of the contact making cams.

So that all the cams may be constructed alike they are made as shown in Figure 4, in which the center of the cam surface is 22½° from one diagonal through the square of the opening in the cam, and 67½° from the other diagonal through the square of the opening in the cam. This construction of the cams permits four of them to be used, all constructed identically to make eight contacts of their adjacent switches in a full revolution of the star wheel which has eight openings between its points as shown in Figure 1. This adaptability of the cams is obtained by turning them over to obtain a different angular position from that for which they function before turning.

Figure 3:
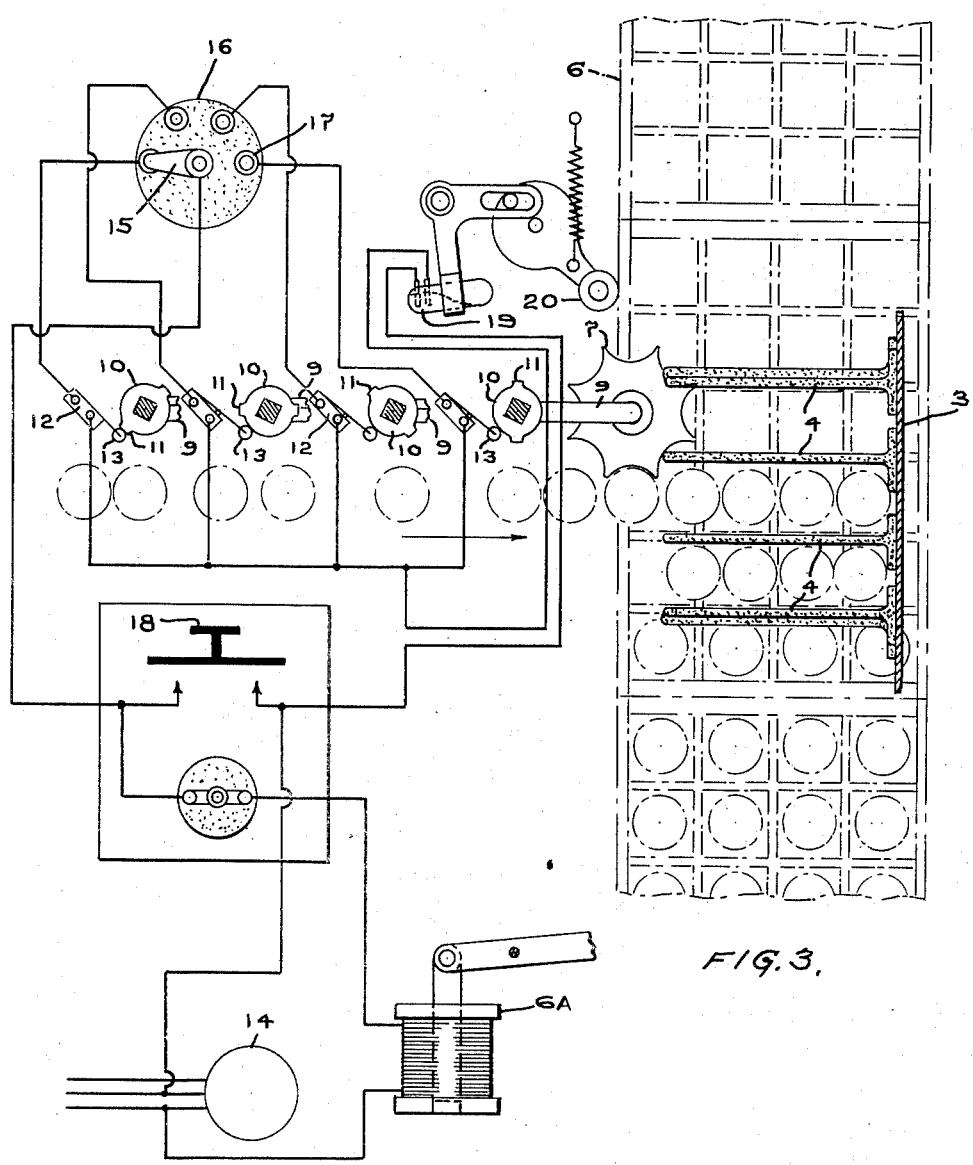
Figure 3 is a schematic view thereof showing the electrical circuits.

As shown diagrammatically in Figure 3 these cams 10 are shown with the shaft 9 broken into sections. Each cam has a switch 12 with a follower 13 thereon which is operated by the cam surfaces 11. As also shown in Figure 3, current from generator 14 to operate solenoid 6A passes to the center or arm 15 of switch 16 on one side, and on the other side through the switches 12 to the separate contacts 17 on the switch 16.

Although there are eight contact making cam surfaces and eight pockets in the star wheel as shown in Figure 3 the machine is set up to deliver groups of four bottles each to the magazine spaces. As will be apparent from this Figure 3, the cam surfaces 11 being 180° apart, when the circuit is closed by one cam surface 11, as shown at the left in this figure, with the passage of a bottle with that closure, because of the setting of arm 15, the circuit will not be closed as the next three bottles pass, because the other contacts 17, connected to the other switches 12, are not connected to arm 15. But when the next, fourth bottle, passes, the surface 11 which is 180° removed from that shown closing the circuit at the left in Figure 3, then comes around, and closes the circuit again, the magazine moves the four bottles forward.

As a plurality of bottles are passed along conveyor 1, carried thereby, they are pushed between the blades 4 of the magazine 3 and unless the arm 15 of the switch 16 is on one of the contacts 17, the magazine does not operate, but the conveyor 1 is allowed to simply slide along under the bottles. With this condition existing the operator can start a sequence of the delivery of four bottles from each compartment of the magazine by simply turning arm 15 around the contacts 17 until the magazine moves. The arm 15 is then left on the contact 17 which caused the movement through the completion of the current through the circuit. Should a bottle be removed from the conveyor 1 because of an imperfection in the bottle or its contents, after passing the star wheel, the delivery of precisely four bottles from each compartment of the magazine can be corrected to replace the removed bottle, by throwing the arm 15 to the appropriate contact 17 and the delivery of four bottles from each compartment of the magazine will continue until another bottle is removed for cause or until another reason may suggest a further change of the cycle of delivery or grouping of the bottles for delivery from the magazine.

A master switch 18 may be closed in any time by the operator to move the magazine. The closing of this switch shorts the current so that the actuation of the solenoid is not dependent upon the action of the switch 16 and of its electrically connected cams 10.

As likewise shown in applicant's above mentioned patent a mercury switch 19 operated by roller 20 in contact with the moving cases 6 may open the circuit to stop the magazine movement in the event of there being no case under the magazine to receive the oncoming bottles.

Figure 2:
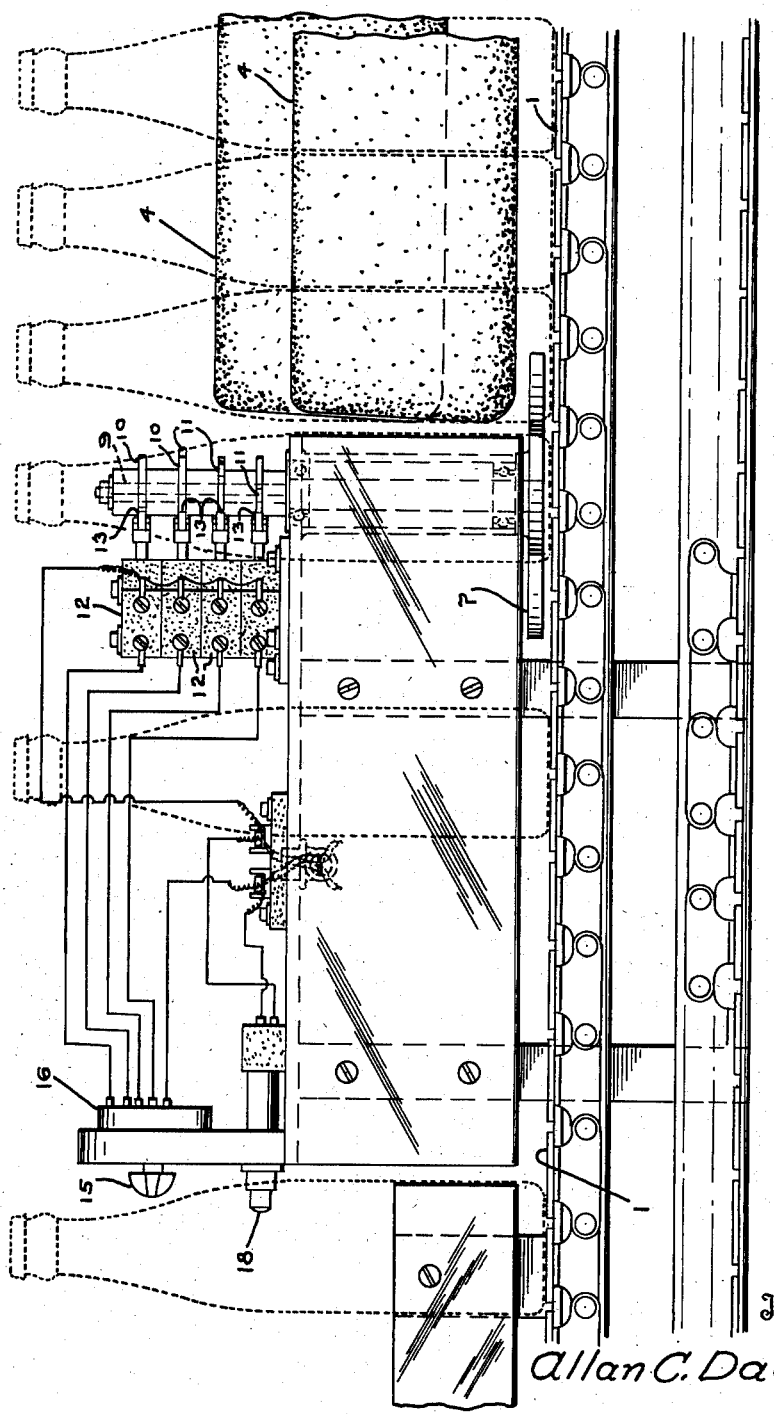
Figure 2 is a side elevational view thereof.
Figure 5:
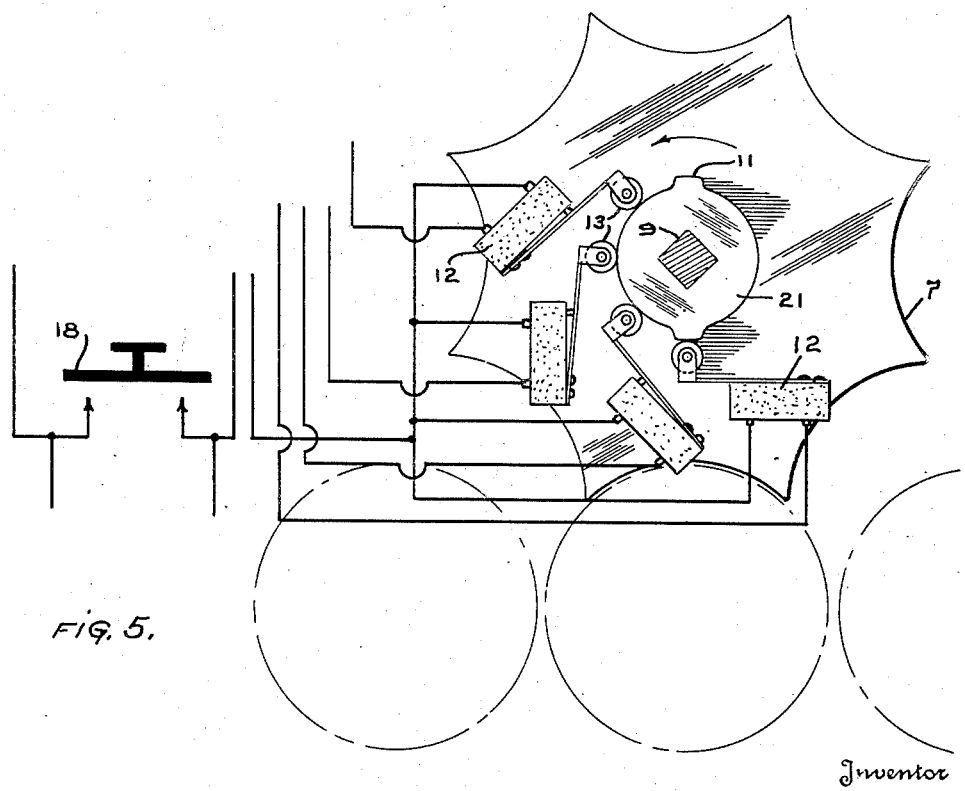
Figure 5 is a plan view of a modification of the switch operating mechanism.

As shown in Figures 1, 2 and 3, the cams 10 and switches 12 are in a vertical column and bank respectively. A modified form is shown in Figure 5 in which the switches are placed horizontally, circumferentially around a single cam 21 which is operated by an identical star wheel 7.

The operation of the grouping mechanism will be apparent from the above description and it will likewise be apparent that the grouping may be varied by the operator throwing the switch arm 15 on the switch 16, irrespective of the number of articles just previously having passed the star wheel, so that the grouping for any one operation may be varied at will, and thereafter the grouping so varied will continue until changed again. It will likewise be apparent that the number in each group can be varied by varying the number of contacts made by the cams on the switch 12 and the number of contacts 17 on the switch 16.

Other variations in the construction illustrated may be made without departing from the invention defined in the following claims.

What is claimed as new and is desired to be secured by Letters Patent is:

1. In an article grouping mechanism having a supply conveyor to support and convey a line of articles and a receiving conveyor and means to drive the conveyors to deliver articles in groups from the supply conveyor to the receiving conveyor, a star wheel counter in the path of articles on the supply conveyor turned one point by the passage thereby of each article, and a plurality of electrical contacts, one actuated by each point turn of the star wheel, the transfer of each group of articles being effected through one of said contacts and said driving means, when the predetermined number of articles for the group have passed the star wheel.

2. In an article grouping mechanism having a supply conveyor to support and convey a line of articles and a receiving conveyor and means to drive the conveyors to deliver articles in groups from the supply conveyor to the receiving conveyor, a star wheel counter in the path of articles on the supply conveyor turned one point by the passage thereby of each article, and a plurality of electrical contacts, one actuated by each point turn of the star wheel, the transfer of each group of articles being effected through one of said contacts and said driving means, when the predetermined number of articles for the group have passed the star wheel and means to render a selected electrical contact effective, to successively effect the transfer of the predetermined number for each group, irrespective of the number of articles that have just previously passed by the star wheel.

3. In an article grouping mechanism having a continuously driven conveyor to support and convey a guided line of articles and a magazine having therein a plurality of receiving spaces and means to drive the magazine to dispose successive spaces to receive and carry articles from the conveyor transferred to the magazine by said conveyor, counting means adjacent the conveyor extending over the conveyor into the line of articles and actuated by each article passing thereby, the magazine driving means being actuated by the counting means upon the passage thereby of a predetermined number of articles.

4. In an article grouping mechanism having a continuously driven conveyor to support and convey a guided line of articles and a magazine having therein a plurality of receiving spaces and means to drive the magazine to dispose successive spaces to receive and carry articles from the conveyor tranferred to the magazine by said conveyor, counting means adjacent the conveyor extending over the conveyor into the line of articles and actuated by each article passing thereby, means to periodically actuate the magazine drive means upon the passage of a predetermined number of articles past the counting means, and means to set the periodically actuating means to act in its predetermined period irrespective of the number of articles that have just previously passed thereby.

5. In an article grouping mechanism having a continuously driven conveyor to support and convey a guided line of articles and a magazine having therein a plurality of receiving spaces and means to drive the magazine to dispose successive spaces to receive and carry articles from the conveyor transferred to the magazine by said conveyor, counting means adjacent the conveyor extending over the conveyor into the line of articles and actuated by each article passing thereby, the magazine driving means being actuated by the counting means upon the passage thereby of a predetermined number of articles and means to render the counting means effective, for its predetermined number of articles to actuate the magazine driving means, irrespective of the number of articles that have just previously passed thereby.

6. In an article grouping mechanism having a continuously driven conveyor to support and convey a guided line of articles and a magazine having therein a plurality of receiving spaces and continuously operating means to drive the magazine to dispose successive spaces to receive and carry articles from the conveyor transferred to the magazine by said conveyor, counting means adjacent the conveyor extending over the conveyor into the line of articles and actuated by each article passing thereby, means actuated by said counting means to render the continuously operating magazine drive means effective to drive the magazine, upon the passage thereby of a predetermined number of articles.

7. In an article grouping mechanism having a continuously driven conveyor to support and convey a guided line of articles and a magazine having therein a plurality of receiving spaces and continuously operating means to drive the magazine to dispose successive spaces to receive and carry articles from the conveyor transferred to the magazine by said conveyor, counting means adjacent the conveyor extending over the conveyor into the line of articles and actuated by each article passing thereby, means actuated by said counting means to render the continuously operating magazine drive means effective to drive the magazine, upon the passage thereby of a predetermined number of articles and means to render the counting means effective, for its predetermined number of articles to pass thereby between magazine movements, irrespective of the number of articles that have just previously passed by the counting means.

8. In an article grouping mechanism having a continuously driven conveyor to support and convey a guided line of articles and a magazine having therein a plurality of receiving spaces and continuously operating means to drive the magazine to dispose successive spaces to receive and carry articles from the conveyor transferred to the magazine by said conveyor, counting means adjacent the conveyor extending over the conveyor into the line of articles and actuated by each article passing thereby, electrical means operated by the counting means to mechanically render the continuously operating magazine drive means effective to drive the magazine, upon the passage by the counting means of a predetermined number of articles.

9. In an article grouping mechanism having a continuously driven conveyor to support and convey a guided line of articles and a magazine having therein a plurality of receiving spaces and continuously operating means to drive the magazine to dispose successive spaces to receive and carry articles from the conveyor transferred to the magazine by said conveyor, counting means adjacent the conveyor extending over the conveyor into the line of articles and actuated by each article passing thereby, a plurality of electrical contacts, one of which is operated by each movement of the counting means to render the continuously operating means effective to drive the magazine and means to render any selected contact effective to actuate the magazine drive.

ALLAN C. DAVIS.

REFERENCES CITED

The following references are of record in the file of this patent:

UNITED STATES PATENTS

| Number | Name | Date |
|---|---|---|
| 646,469 | Sleeper | Apr. 3, 1900 |
| 1,243,408 | Hawthorne | Oct. 16, 1917 |
| 1,476,023 | Phelps | Dec. 4, 1923 |
| 1,832,343 | Wittman | Nov. 17, 1931 |
| 1,896,639 | Meyer | Feb. 7, 1933 |
| 2,043,763 | Meyer | June 9, 1936 |
| 2,052,840 | Nussbaum | Sept. 1, 1936 |